US009644857B1

(12) United States Patent
Ashgriz et al.

(10) Patent No.: US 9,644,857 B1
(45) Date of Patent: May 9, 2017

(54) VIRTUAL THERMOSTAT FOR A ZONAL TEMPERATURE CONTROL

(71) Applicants: Nasser Ashgriz, Toronto (CA); Mohamed Alhashme, Toronto (CA)

(72) Inventors: Nasser Ashgriz, Toronto (CA); Mohamed Alhashme, Toronto (CA)

( * ) Notice: Subject to any disclaimer, the term of this patent is extended or adjusted under 35 U.S.C. 154(b) by 0 days.

(21) Appl. No.: 14/955,682

(22) Filed: Dec. 1, 2015

(51) Int. Cl.
*F24F 11/00* (2006.01)
*G05B 13/04* (2006.01)

(52) U.S. Cl.
CPC ........ *F24F 11/006* (2013.01); *F24F 11/0012* (2013.01); *F24F 11/0086* (2013.01); *G05B 13/041* (2013.01); *F24F 2011/0038* (2013.01); *F24F 2011/0058* (2013.01); *F24F 2011/0061* (2013.01); *F24F 2011/0072* (2013.01)

(58) Field of Classification Search
CPC G05D 23/1932; F24F 11/006; F24F 11/0012; F24F 11/0086; F24F 2011/0072; F24F 2011/0038; F24F 2011/0058; F24F 2011/0061; G05B 13/041
USPC ........................................................ 700/278
See application file for complete search history.

(56) References Cited

U.S. PATENT DOCUMENTS

| | | | | |
|---|---|---|---|---|
| 6,715,689 B1* | 4/2004 | Lee | ...................... | F24F 11/0034 236/49.3 |
| 8,306,794 B2* | 11/2012 | Hamann | .................. | G06F 1/206 703/5 |
| 2005/0113978 A1* | 5/2005 | Sharma | .............. | G05D 23/1932 700/259 |
| 2005/0267639 A1* | 12/2005 | Sharma | .............. | G05D 23/1931 700/276 |
| 2008/0281472 A1* | 11/2008 | Podgorny | ............ | F24F 11/0009 700/276 |
| 2009/0326884 A1* | 12/2009 | Amemiya | ............... | G06F 1/206 703/6 |
| 2010/0036533 A1* | 2/2010 | Masuda | ............... | F24F 11/0034 700/278 |

(Continued)

OTHER PUBLICATIONS

Nielsen, Peter Vilhelm. "Computational fluid dynamics and room air movement." Indoor air 14.s7 (2004): 134-143.*

(Continued)

*Primary Examiner* — Christopher E Everett
(74) *Attorney, Agent, or Firm* — Nasser Ashgriz; Uipatent Inc.

(57) ABSTRACT

A virtual thermostat to control an air condition of any target zone in an HVAC controlled space. The thermostat comprising of a 3D scanner to provide a 3D point cloud of the controlled space; a CAD-application algorithm to modify the point cloud into a 3D model of the space; a control panel for a user to input a set of boundary and initial conditions and a desired air condition at the target zone inside the controlled space; a fluid flow software having means to read said 3D model and to determine a spatial velocity and temperature distributions throughout the controlled space, and to calculate an average temperature for the target zone in the controlled space; a control system to manage the air inlet flow to control the temperature at the target zone in the controlled space by comparing the calculated average temperature of the target zone with a user defined temperature and to turn the HVAC system ON and OFF.

14 Claims, 18 Drawing Sheets

(56) References Cited

U.S. PATENT DOCUMENTS

| | | | | |
|---|---|---|---|---|
| 2011/0190945 A1* | 8/2011 | Yoshii | F24F 11/0034 | 700/277 |
| 2012/0158387 A1* | 6/2012 | VanGilder | G06F 17/5009 | 703/9 |
| 2012/0197444 A1* | 8/2012 | Wang | G05D 23/1932 | 700/276 |
| 2012/0209435 A1* | 8/2012 | Harayama | F24F 11/0086 | 700/276 |
| 2012/0245905 A1* | 9/2012 | Dalgas | G06F 17/5004 | 703/2 |
| 2012/0298348 A1* | 11/2012 | Mise | F24F 11/006 | 165/287 |
| 2012/0303344 A1* | 11/2012 | Cruz | G06F 17/5009 | 703/9 |
| 2012/0316784 A1* | 12/2012 | Chrysanthakopoulos | G01C 21/206 | 701/519 |
| 2012/0323376 A1* | 12/2012 | Honda | G05D 23/1932 | 700/276 |
| 2013/0013119 A1* | 1/2013 | Mansfield | G05D 23/1934 | 700/286 |
| 2013/0204593 A1* | 8/2013 | Doorhy | G06F 17/50 | 703/2 |
| 2013/0289778 A1* | 10/2013 | Ishizaka | F24F 11/006 | 700/276 |
| 2014/0039688 A1* | 2/2014 | Saisu | G05D 23/19 | 700/276 |
| 2014/0039689 A1* | 2/2014 | Honda | G05B 15/02 | 700/276 |
| 2014/0135997 A1* | 5/2014 | Bradley | F24F 11/0034 | 700/278 |
| 2015/0041550 A1* | 2/2015 | Honda | F24F 11/0012 | 236/51 |
| 2015/0134123 A1* | 5/2015 | Obinelo | G05B 15/02 | 700/277 |
| 2016/0042520 A1* | 2/2016 | Taneja | G06K 9/00335 | 382/154 |

OTHER PUBLICATIONS

Zhai, Zhiqiang, et al. "On approaches to couple energy simulation and computational fluid dynamics programs." Building and Environment 37.8 (2002): 857-864.*

* cited by examiner

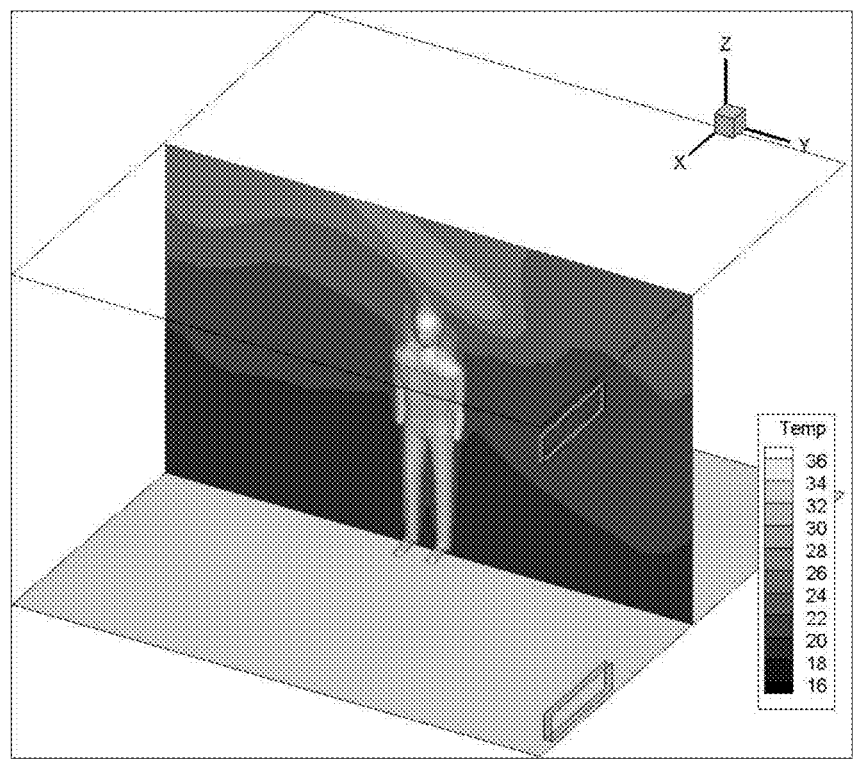
Figure 2-A
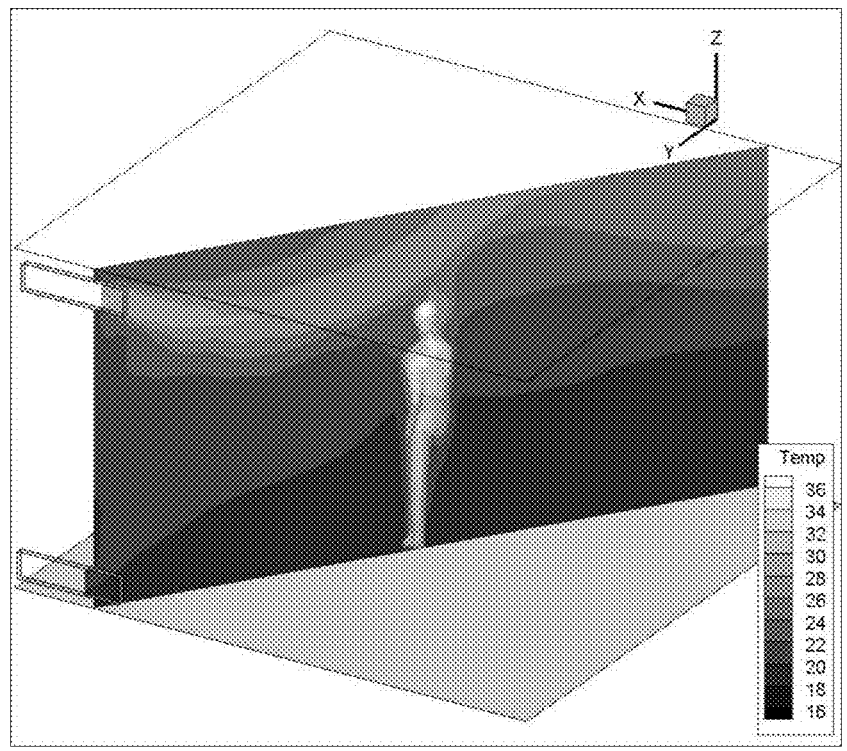
Figure 2-B

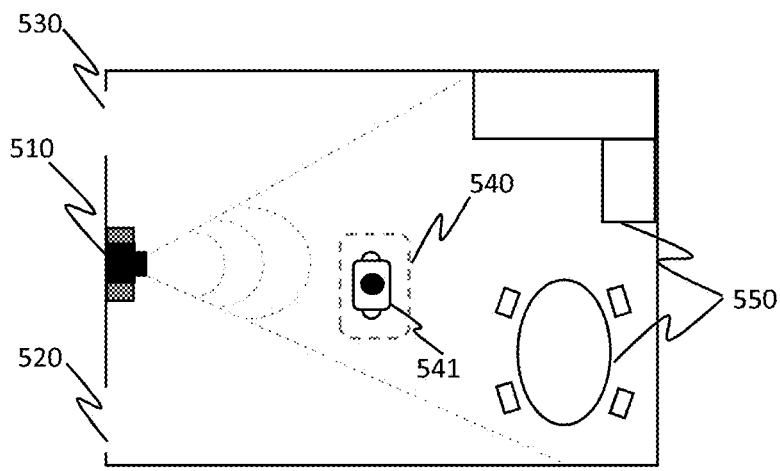
Figure 5-A
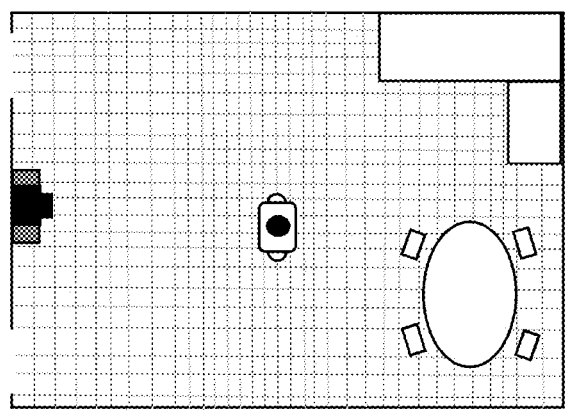
Figure 5-B
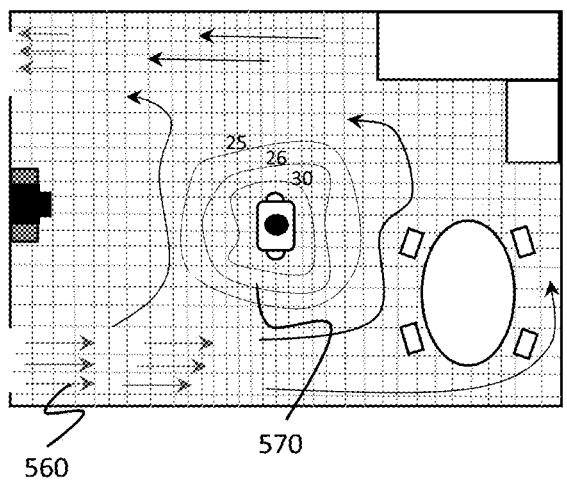
Figure 5-C

VIRTUAL THERMOSTAT FOR A ZONAL TEMPERATURE CONTROL

FIELD OF THE INVENTION

The present invention relates to an air-conditioning control system, and more particularly to control of temperature in any desired location in an air conditioned space.

BACKGROUND OF THE INVENTION

Temperature sensors and thermostats are used in a variety of heating, ventilation, and air conditioner (HVAC) systems, as well as in dryers and furnaces. For instance, in industrial paint dryers, a painted object is set inside the dryer for a period of time to rapidly cure the paint. In such devices, a proper control on the temperature around the object significantly affects its final quality. If the drying rate is too fast, the paint will crack and if it is too slow, it will take a longer time to dry, reducing the productivity. Moreover, if the temperature distribution around the object is not even, some spots may remain wet after the operation.

Almost all thermostats use a single temperature sensor at one location to control the temperature of the indoor space (hereinafter, referred to "conventional thermostat"). The disadvantage of a conventional thermostat is that only local temperature around the temperature sensor is controlled. Generally, there is no control on the temperature in locations far from the temperature sensor. FIG. 1 shows the lay down of a conventional thermostat 130 located between the inlet 120 and air outlet 140 to control the temperature in the space 150 with a person 111 in the middle of the space. The target temperature location 110 is around the person. In the conventional thermostat, the user set the temperature to certain level for HVAC system to operate based on (with the assumption of well mixed air condition inside the controlled space). However, the temperature distribution of the air is not well mixed as can be seen in FIG. 2-A and FIG. 2-B (where they show temperature distribution around person in middle of a room with heating system). Air circulation has strong effect on temperature distribution inside the controlled space. The circulation of the air depends on the fan power and direction, and the geometry of the space being controlled. However, the HVAC inlet layout and design are not the only factors to maintain the desired environment on the targeted zone. The location of the temperature sensor represents the targeted zone temperature, which can be very different than the location of interest. This lack of ability to measure the condition of the targeted location relatively far from the thermostat results that conventional thermostat over- or under-estimates the temperature of the targeted location. FIG. 3 compares average temperature around a conventional thermostat and average temperature around a person for an HVAC system. The HVAC system is heating the space to keep the temperature between 25° C. and 24° C. In addition, the HVAC system is turned ON and OFF based on a feedback from the conventional thermostat. Therefore, whenever the temperature around the sensor gets to 25° C. the system turns OFF and turns ON when temperature drops to 24° C. However, because of the distance, the local temperature around the person is over- and under-estimated. The problem of a single point measurement is not just related to temperature measurement but also can be generalized to any single point sensor like humidity sensor, or air velocity sensor.

Human thermal comfort is related to several factors such as temperature, humidity, air velocity. Hence, a better and more efficient HVAC system can be designed, if such factors are better controlled. Improper control of the air temperature reduces the energy efficiency of a HVAC system by more than 40%. In addition to poor energy efficiency, improper temperature control reduces indoor thermal comfort, and may result in other issues depending on the particular application, such as inadequate drying of objects in dryers.

The main object of the present invention is to control the temperature of a particular location or zone, instead of using a single point measuring sensor far away from the targeted location. Since it is not feasible to put temperature sensors throughout the whole space, the temperature control is achieved by simulating the air behavior inside the controlled space. The result is like having number of movable single point measuring sensors inside a specified location, instead of a single temperature measure far away from the interest zone. A computational fluid numerical solver is used to determine air behavior inside the controlled space. This information can be used to estimate the average condition (for example average temperature) around the targeted location. As a result, the average condition can be used to determine when to turn ON and OFF the HVAC system.

SUMMARY OF THE INVENTION

The present device and method utilize a numerical estimation of the air temperature distribution in a space and use that estimation to control an HVAC system. This method may significantly reduce energy consumption and improve human thermal comfort. The average air condition at a specified location inside the space, instead of single point measuring sensor far away from the desirable location, is controlled. The air condition refers to air temperature, air velocity, air humidity, gases concentration in the air, and carried on dust partials by the air. However, here we will only discuss temperature and air velocity. The present thermostat considers the body temperature of the people in the space and controls the heating and cooling of the space according to their body heat input to the space.

Chosen embodiments of the present invention have been developed to solve the problem of unreachable location by single point sensor and merely for real time controlling of a HVAC system by simply predicating a local air condition at any location inside the controlled space.

The present invention is a virtual thermostat, which can estimate the air condition in targeted location by using computational numerical solver such as computational fluid dynamic (CFD). The system integrates Computer Aided Engineering (CAE) with computer vision (CV) technology in order to provide a distributive air condition measurement inside the controlled space. The invention has input device operated by a user to import a desired location and its temperature range inside the controlled space. The device reconstructs a 3D geometry of the indoor space and its boundary condition which includes people location and furniture's layout. The 3D model of the space is then imported to mesh generator before it goes to a fluid dynamic numerical solver to calculate the temperature and velocity distribution of the air inside the controlled space. The numerical solver affords the condition of the air inside the controlled space for every time step (can be second). Those information are be used to measure average air condition and rate of change at any location inside the controlled space. In addition, human thermal comfort can be estimated using those information around the person by calculating predicted mean vote (PMV) factor. Based on those information and the user specification, the HVAC control system turn ON or OFF.

The present invention includes a device to generate a 3D point cloud of a controlled space boundary, an application code to convert the 3D point cloud to a simplified representation of 3D geometry, an infrared camera sensor to detect location of hot objects on the controlled space, set of single point temperature sensors to measure initial room temperature and inlet temperature, an air velocity sensor to measure air inlet velocity, internet connection to get local weather prediction, a mesh generator and fluid flow software to solve Navier Stokes and energy equations-, analytic code to analysis output data from the fluid solver and operate the HVAC system based on, communication portion to communicate between the different parts of the device and HVAC system, a user-programmable interface with displaying screen to get input data from the user, and an information processing unit such as computer to perform the numerical calculation and to manage the communication between different parts of the invention device. The information processing unit is preferably includes a graphics processing unit to reduce the computational time.

The preferred personifications of the present invention provide convenient way to control HVAC system which considerably reduce the energy consumption and improve human thermal comfort inside the controlled space. The main feature of the device is estimating the average air condition in the target location and use it as feedback instead of single point measuring sensor far away from the target location.

Other components, steps, features and advantages of the present invention will become clearer from the next detailed explanation with reference to the attached drawing.

BRIEF DESCRIPTION OF THE DRAWINGS

FIG. 2-A is a computed front cross sectional contour of temperature distribution around a standing person.

FIG. 2-B is a computed side cross sectional contour of temperature distribution around a standing person.

FIG. 5-A illustrates a space and HVAC system layout.

FIG. 5-B illustrates the space of FIG. 5*a* after a space mesh is applied.

FIG. 5-C shows temperature and velocity distribution in the space.

DETAILED DESCRIPTION OF THE DRAWINGS

Figure 1:
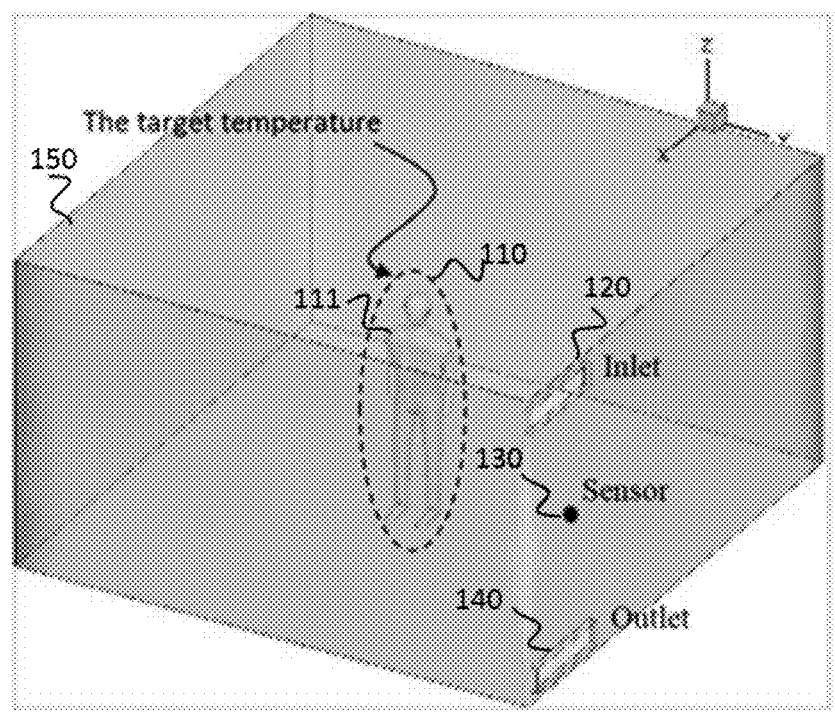
FIG. 1 is illustrative example of a person inside a heated room with conventional temperature sensor.
Figure 3:
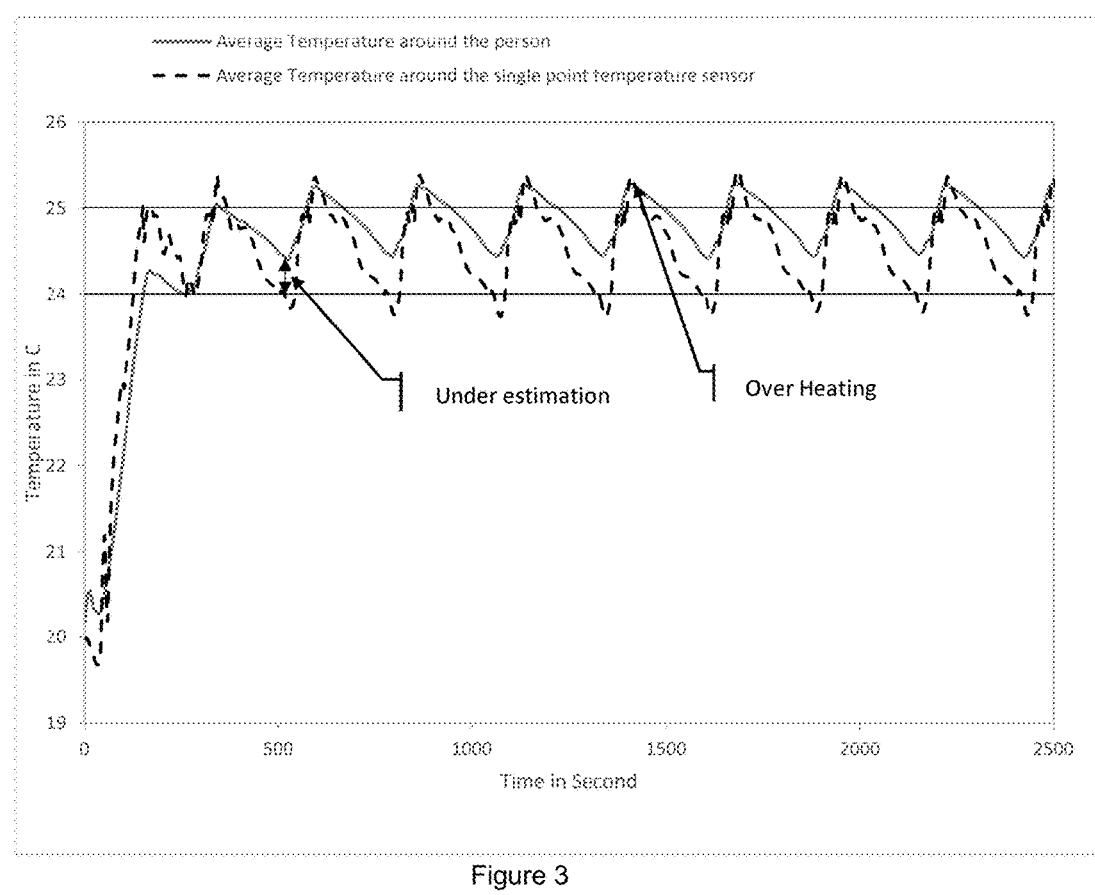
FIG. 3 is illustrative example to show the difference between average temperature around a single point temperature sensor and average temperature around a standing person for a certain period of time.

The present system is a virtual thermostat, which can control the temperature at a target zone or location in an HVAC controlled space. This system operates based on a theoretical calculation of the temperature inside the space using a computational fluid dynamic (CFD) software.

The present virtual thermostat is designed to control the temperature of a specific target zone in an HVAC controlled space, in which the HVAC system has an inlet duct and an outlet duct. The system comprises of the followings:

a. A 3D scanner to scan and generate a 3D point cloud raw data of a controlled space boundary. The prior art provides such devices, such a Kinect system by Microsoft corp. In order to capture the whole geometry of the controlled space, the 3D scanner is installed on a pan tilt platform, which has two servo motors, one of them to rotate the 3D scanner 180° degrees and the other one to tilt it up and down.

b. A graphics-application program to modify the 3D point cloud raw data into a simplified representation of the geometry of the controlled space. In addition, the graphic-application program detects people or objects in motion and provides a velocity vector to represent the movement.

c. An infrared camera sensor measures the space boundary temperature, which is used to specify sources of heat, such as lamps as well as providing wall temperatures in the space.

d. A set of single point temperature sensors to measure air temperature at certain locations in the space. One sensor is set in the air inlet duct to measure the air inlet temperature. The other sensor is set on a wall in the controlled space. The sensor on the wall is used together with the infrared data to estimate the initial temperature of the space and to calibrate the results from the numerical solver by comparing the average temperature estimation around the sensor from the solver with real reading from temperature sensor itself.

e. An air velocity sensor to measure the air inlet velocity.

f. A GPS device to specify the location of the controlled space and to utilize a local weather forecasting data provided over an internet connection in order to determine outside boundary conditions of the controlled space, and to estimate the shadow effects from the surrounding buildings, for example by using a 3D model of google earth.

g. A mesh generator and a fluid flow software to determine the spatial temperature distribution across the controlled space by solving the Navier Stokes (NS) and energy equations.

h. An analytic-code to analyze and compare the data from the numerical solver with the user specification and decide to turn ON or OFF the HVAC air inlet system.

i. A user-programmable interface with displaying screen for the user to input a set of boundary conditions and a desired air condition in a preferred target zone or location of the controlled space. The input device can be a mouse, a keyboard, or a touch screen tablet or a similar device. A display screen (LCD, a CRT or the like) is provided to show information such as operation menu, and input/output data.

j. An information processing device (microprocessor system+memory device) such as a computer to act as the main processing unit of the device. The information processing device has the ability to read and execute programs from the memory. A graphics processing unit (GPU) can be used to boost the computational speed. The memory is made from storage device which has the ability to save different types of data.

The above mentioned components are design support systems and they are not limited to the above-description configuration and can be implement using other similar configuration.

How the device works: The virtual thermostat which is presented here can control the HVAC system based on the targeted spatial temperature distribution of interior spaces. A device, such a "Microsoft Kinect" is used to scan and reconstruct a 3D model of a controlled space. Kinect gives raw point cloud data which is then converted to a high level representation to represent space boundary surface. The Geometry representation should be saved as one of those CAD file format such as STereoLithography (STL) file. Oliver Mattausch algorithm (or any similar algorithm) is used to convert point cloud into 3D representation of the controlled space surface. An infrared camera is used to directly measure the surface temperature of the interior objects. This surface temperature is calibrated with a 3D geometry using Stephen Vidas algorithm for 3D thermal mapping of building interiors using an RGB-D and thermal camera. Any other similar algorithms can be used. The calibrated data are then used to locate the source of heat objects such as lighting lamps, computers and so on. By getting the average temperature of the interior objects and from the temperature sensor readings, an average initial temperature can be calculated for the interior air. The interior space is meshed by mesh generator to create finite volume mesh for the numerical flow solver. For the exterior weather condition, an application app is used to determine the average weather condition based on the GPS location. From the google earth, the device obtains the 3D geometry of the outside surrounding of the controlled space. Based on the 3D surrounding and the sun altitude, the device can estimate the shadowing effects on the building. These information are provided as the boundary conditions, initial conditions, and heat loads factors to a 3D numerical solver. The numerical flow algorithm solve and estimate the condition contours cross the whole controlled domain. Therefore, the temperature at any interior location of the space can be identified and the same thing for velocity and humidity. The virtual thermostat turns ON and OFF the HVAC system based on those information and user preferable condition. To speed up the numerical calculation a graphic processor unit (GPU) is used to act as the main processing unit of the virtual thermostat.

Figure 4:
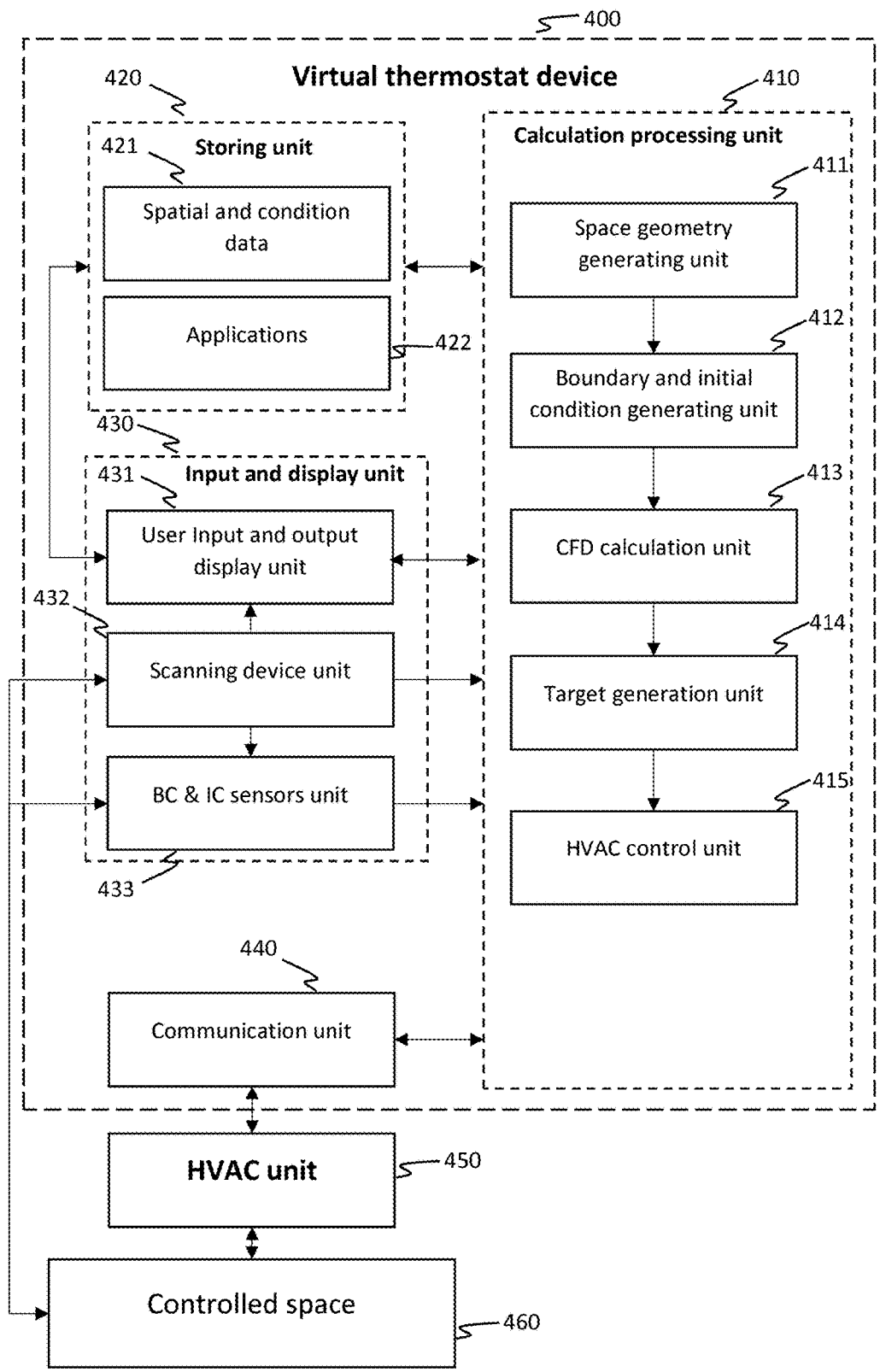
FIG. 4 is a block diagram to illustrate the structure and components of the virtual thermostat.

With the reference to FIG. 4, the components and the embodiments of the present virtual thermostat device 400, and the communication flow between those components are as follows: A calculation processing unit 410, a storing unit 420, an input and output display unit 430, and a communication unit 440. The virtual thermostat device 400 has the ability to control an HVAC unit 450 based on the estimated average temperature feedback from HVAC control unit 415. The estimated average temperature represents the average temperature at target location in the controlled space 460.

The calculation processing unit 410 is a device where all the information and data is processed, such as a computer, or a tablet. All data processing is performed through programs which have been installed in advance at the storing unit 422.

The space geometry generating unit 411 is a program which converts a 3D point cloud data into a simplified 3D model of the space. In addition, the program has the function to locate people, detect motion, and calibrate a simplified 3D model with infrared data. The space geometry generating unit 411 receives the raw data from a scanning device unit 432.

The boundary (BC) and initial condition (IC) generating unit 412 is a program which sets the boundary conditions and the initial conditions of the 3D model. The boundary conditions include outside temperature, wall thermal resistance, locate sources of heat objects, etc. The boundary conditions are needed for the CFD calculation unit 413. The boundary and initial condition generating unit 412 receives the raw data from the BC and IC sensors unit 433. The raw data include such information as the initial temperature of the space, and the air flow rates into the space.

The CFD calculation unit 413 is a program which can estimate the air circulation and temperature distribution inside the controlled space. The unit starts by meshing the controlled space into finite volume elements which are then imported into a CFD solver to estimate the temperature at each element cell.

The Target generating unit 414 is a program which extracts a volumetric average of the temperature at the target location from the temperature distribution which the CFD calculation unit 413 provides. The unit receives the target location from the user input and output display unit 431.

The HVAC control unit 415 is a program which controls the air inlet of HVAC unit 450 and the inlet boundary conditions of the boundary and initial condition generating unit 412 based on the average target temperature from the target generating unit 414.

The storing unit 420 is a device which has the ability to save several types of data which has been generated from the calculation processing unit 410, and applications for running analysis on raw data. The unit has two main units, the first unit is spatial and condition data unit 421 which can be 3D geometry of the space, and temperature distribution; the second unit is application unit 422 which has all programs that are essential for the virtual thermostat device 400 to work such as CFD software.

The input and display unit 430 is a hardware unit for input and output data. The unit comprises of a user input and output display unit 431, a scanning device unit 432, and a BC and IC sensors unit 433. The unit is responsible for providing raw data to calculation processing unit 410, such as 3D point cloud data, infrared data, and air initial temperature.

The user input and output display unit 431 is a device which receives the input from the user and displays the output on a screen, such as on a touch screen, or on a key panel with a display screen.

The scanning device unit 432 is a device which can generate 3D point cloud data of the controlled space 460, such as Kinect sensor. Furthermore, the unit has infrared camera to receive the surface temperature of the controlled space 460.

The BC and IC sensor unit 433 has a number of sensing devices to measure the air properties such as a thermistor to measure the initial air temperature, and a flowmeter to measure the air inlet flow rate. This unit provides the raw data which have to be interpreted and calibrated in the boundary and initial condition generating unit 412.

Communication unit 440 has the ability to transfer data and signal back and forth from the virtual thermostat device to external devices in the HVAC unit 450 such as fan motor.

With reference to FIG. 5, a simplified 2D drawing sketch of room with a person standing in the middle is shown. In the following, simplified example is used to clarify the device procedure, working method, and make it easy to understand.

FIG. 5-A shows geometric boundaries of a controlled space 550 with HVAC system which has an air inlet 520 and an air outlet 530. The 3D reconstruction device 510 is fixed in clear practical location at the wall for better 3D reconstruction. The user 541 needs to specify the location and its preferred condition. For the location, the user either enters the x, y, z coordinate of a location or chooses to set the location to follow the user location in the room. In addition, the user needs to specify the targeted zone 540 size by giving the length, width, and height. If the user did not specify the target zone size, the default zone size is 1 m width, 1 m length, and 2 m height. For air condition in the targeted zone, the user has to specify a temperature range (max and min), or level of the thermal comfort inside the zone. The user then presses start controlling button on the device control panel to start controlling the HVAC system. The virtual thermostat generates a 3D geometry of the controlled space including the people and objects inside the controlled space. Next, the virtual thermostat automatically sends the 3D geometry to a mesh generator. The mesh generator creates a finite volume mesh of the whole controlled domain, see FIG. 5-B. The initial condition is measured using an infrared camera, and a single point temperature sensor while the outside boundary condition is estimated using a weather forecasting application connected to internet. As a next step, the virtual thermostat estimates the air condition distribution inside the controlled space. FIG. 5-C shows the velocity and temperature distributions inside the space. The virtual thermostat has a numerical solver to estimate the velocity vectors 560 and temperature distribution 570 of the controlled space by solving the Navier Stokes equation and the energy equation using a CFD solver. The virtual thermostat uses those information to calculate the volumetric average temperature of the specified zone. From the average temperature and the user preferred condition, the virtual thermostat automatically calculates an operation time of the HVAC system. If the average temperature in the targeted zone reaches the maximum preferred condition, the virtual thermostat turns the HVAC system OFF and if the temperature drops below a minimum preferred condition, the device turns the HVAC system ON. If there is any movement in the controlled space, the virtual thermostat detects the movement and determines its new location and repeats the calculation.

Figure 6:
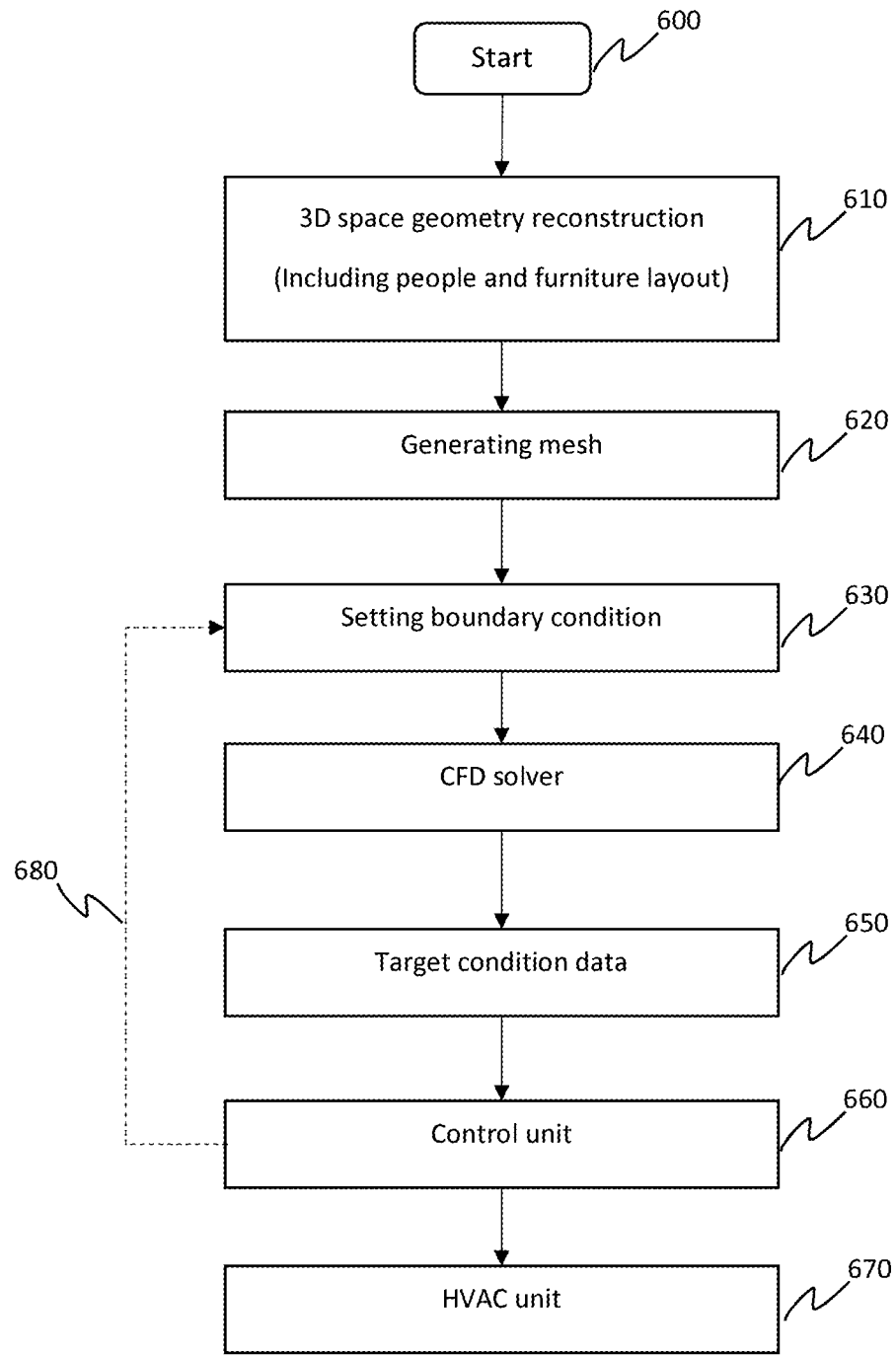
FIG. 6 is simplified flow chart to show the main step in the virtual thermostat device.

FIG. 6 is a simplified flow chart to show the main steps in the virtual thermostat device. When the virtual thermostat device starts 600, the virtual thermostat reconstruct a 3D model of the controlled space 610, which includes people's locations and furniture layout, and the calibrated infrared data with the 3D model. Next, the 3D model of the space is sent to a mesh generator 620 to produce a finite volume mesh for the whole controlled space domain. Next, the boundary and the initial conditions of mesh are set up 630. These include the source of heat objects, the inlet conditions, the outside temperature, and the shadow effects on the outside walls, the initial air temperatures, and the wall thermal resistances. After the boundary and the initial conditions are set, the virtual thermostat starts to estimate the temperature distribution inside the controlled space using a CFD solver 640 by solving the Navier Stoke and energy equations for every time step. The next step is to extract the average temperature at the target location 650. Next, the control unit 660 starts to compare the average target temperature with the user specification range and based on this comparison the HVAC unit 670 turns ON or OFF. In addition, the control unit 660 has to change the inlet condition of the CFD simulation solver 640 through sending signal 680 back to set the boundary conditions 630.

Figure 7:
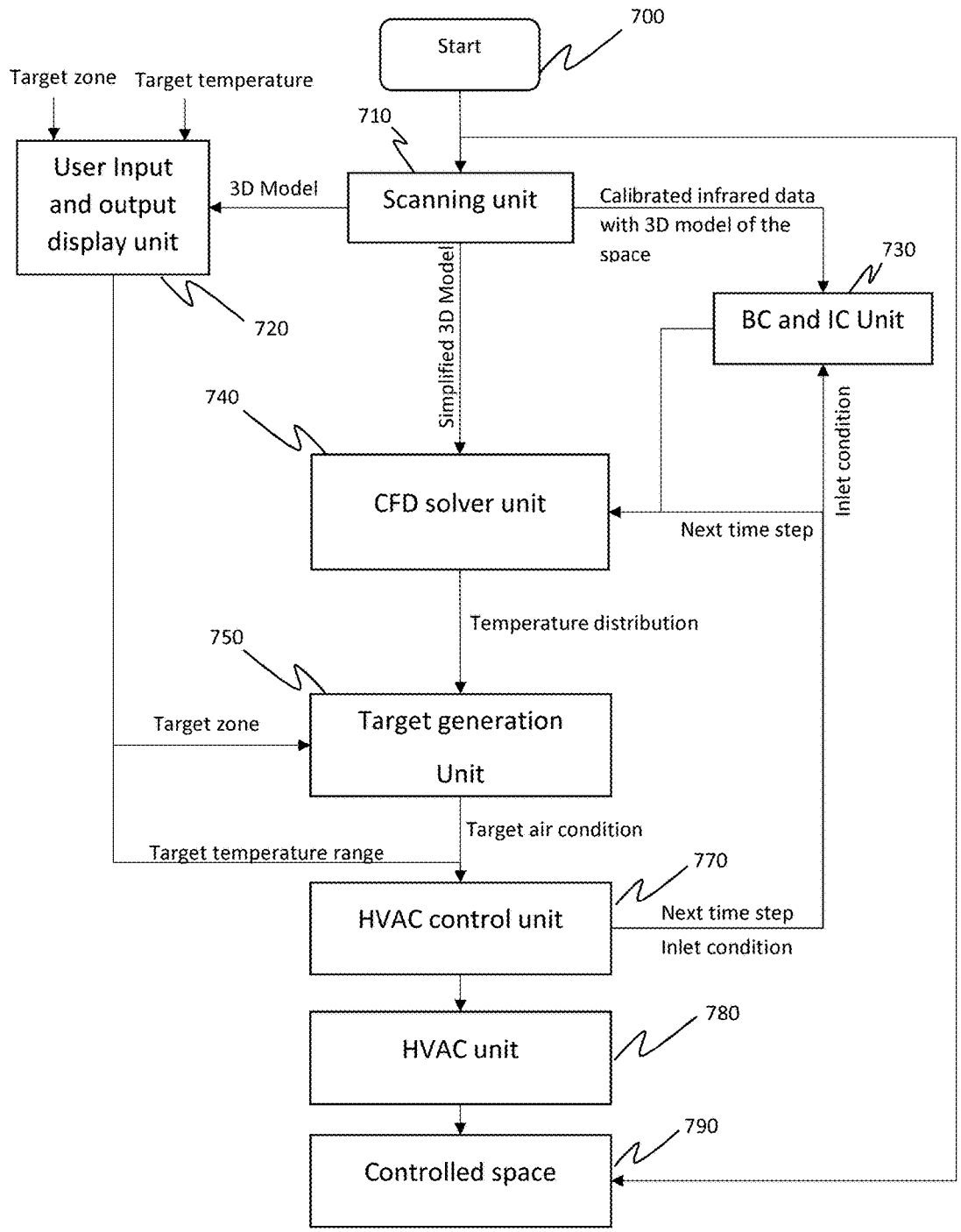
FIG. 7 show more detailed flow chart of the virtual thermostat device process and data transfer between different components.

FIG. 7 shows a more detailed flow chart of the process and data transfer between different components of the present device. The virtual thermostat starts 700 by sending a signal to the scanning unit 710, which starts to reconstruct a 3D model of the controlled space 790 with a calibrated infrared data of the controlled space's surface temperature 790. Furthermore, the inlet and the outlet location sensors are used to locate the inlet and outlet in the controlled space. The three dimensional model of the controlled space 790 is then sent to a user input and output display unit 720, and a simplified 3D model is send to the CFD solver unit 740. In addition, a calibrated 3D model with an infrared data is sent to the BC and IC unit 730.

The user input and output display unit 720 displays the 3D model of the space so that a user can select the target zone. Moreover, the user has to input the target temperature range. Then the unit sends the target zone information to the target generation unit 750 and the target temperature range to HVAC control unit 770.

The BC and IC unit 730 receives calibrated 3D model of the space with infrared data and utilizes them to find the source of heat objects. In addition, this unit finds the outside temperature, the shadow effects in the walls, the initial temperature of the air inside the controlled space, and the inlet conditions of the air (temperature and flow rate). After setting the BC and IC, the unit sends those information to the CFD solver unit 740. Moreover, the unit is responsible for changing the inlet boundary conditions based on the respond from HVAC control unit 770.

The CFD solver unit 740 receives the simplified 3D model and its boundary and initial conditions. The unit starts with meshing the domain and then solving the Naveir Stoke equation and energy equation across the controlled space. The unit then sends the temperature distribution to the target generation unit 750 to extract the average target temperature. In addition, the unit receives a signal from the HVAC control unit 770 for when to go to the next step.

The target generation unit 750 receives temperature distribution of the controlled space from the CFD solver unit 740 and the target zone from the user input and output display unit 720. Based on those two information, the unit extracts the average temperature of the target zone and sends it to the HVAC control unit 770.

The HVAC control unit 770 receives the average target temperature from the target generating unit 750, and the target temperature range from the user input and output display unit 720. Base on that information the unit turns the HVAC unit 780 ON and OFF. At the same time, it sends the information on the inlet status to the BC and IC unit 730 and a signal to the CFD solver unit 740.

For the device to estimate heat loses through the walls, the wall layout and properties need to be specified, including the interior and exterior walls, wall facing directions, and the wall thermal resistance. The user imports a preferred air condition and location inside the controlled space using the virtual thermostat control panel or an application on a virtual device such as virtual tablet or phones.

When the preferred condition and location are specified by the user, the virtual thermostat creates the 3D model of the space boundary. The temperature sensor and the infrared data are used to specify the interior initial condition by estimating the average temperature from both reading. From GPS location, outside conditions can be stated through internet connection. The 3D representation of the space will be imported to mesh generator to create a finite volume mesh. Next, the finite volume mesh and its boundary condition is imported to the numerical solver. The numerical solver estimate the condition distribution of air in the room. The average air condition at the specified location can be estimated using volumetric averaging and the virtual thermostat that gives feedback through the control system to manage the HVAC system operation time. Any change on the geometry later on the device need to track the change and modify the geometry.

Figure 8:
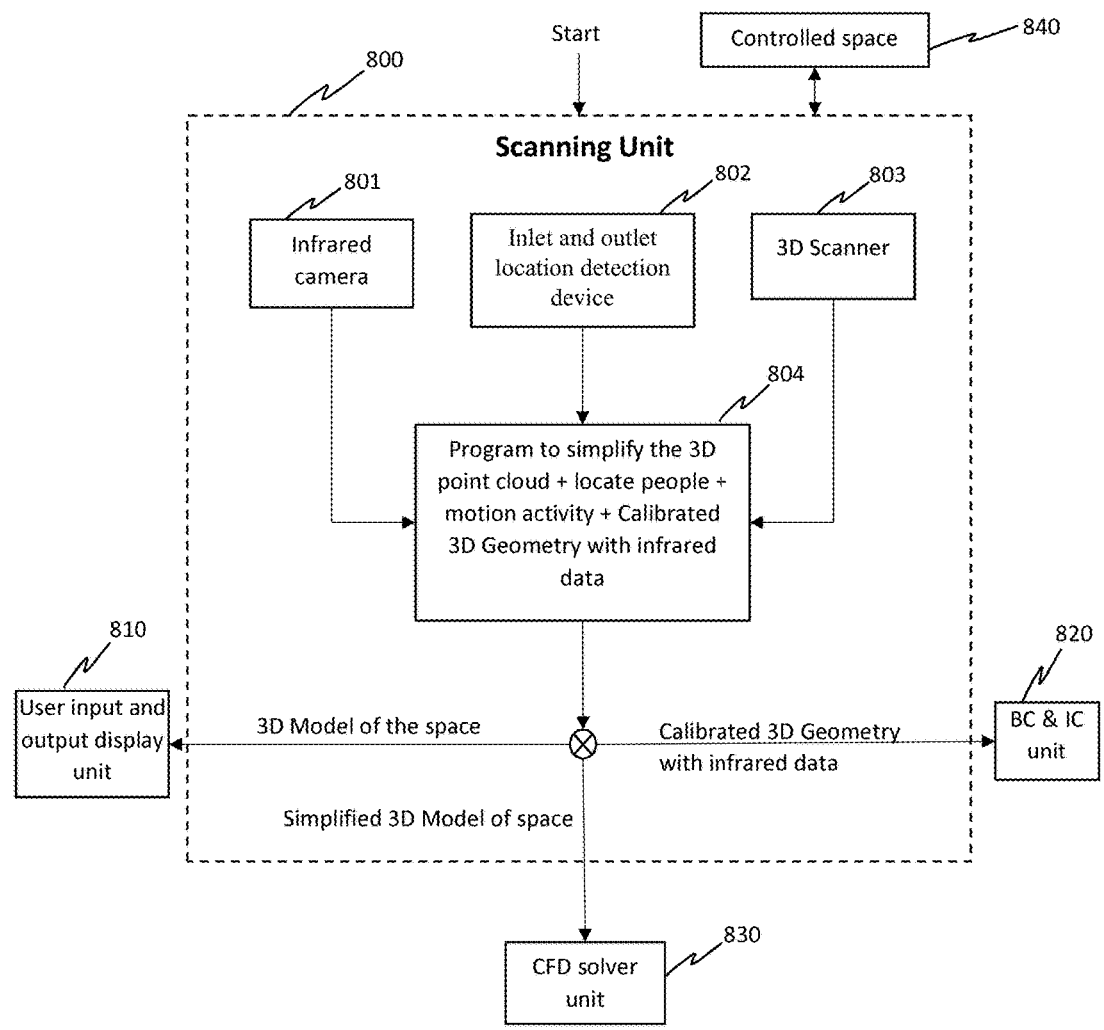
FIG. 8 shows scanning unit components and data flow.

With reference to FIG. 8, the scanning unit 800 comprises of an infrared camera 801, an inlet and outlet location detection device 802, a 3D scanner 803, and a program 804. The unit starts by scanning and generating a 3D point cloud data of the controlled space 840 using a 3D scanner 803. At the same time, the infrared camera 801 generates the temperature distribution of the surface for the controlled space 840. The inlet and outlet location device 802 detects the coordinate of the inlet and outlet inside the controlled space 840. Those data are imported to the program 804, which transfers the point cloud data to a higher level and simplifies the 3D CAD model. In addition, the program traces any activity inside the space, locates people, and calibrates the point cloud data with the infrared data. When the program finishes, the unit sends the 3D model of the space to a user input and output display unit 810, the simplified 3D model of the space to CFD solver unit 830, and the calibrated 3D model with infrared data to the BC and IC unit 820.

Figure 9:
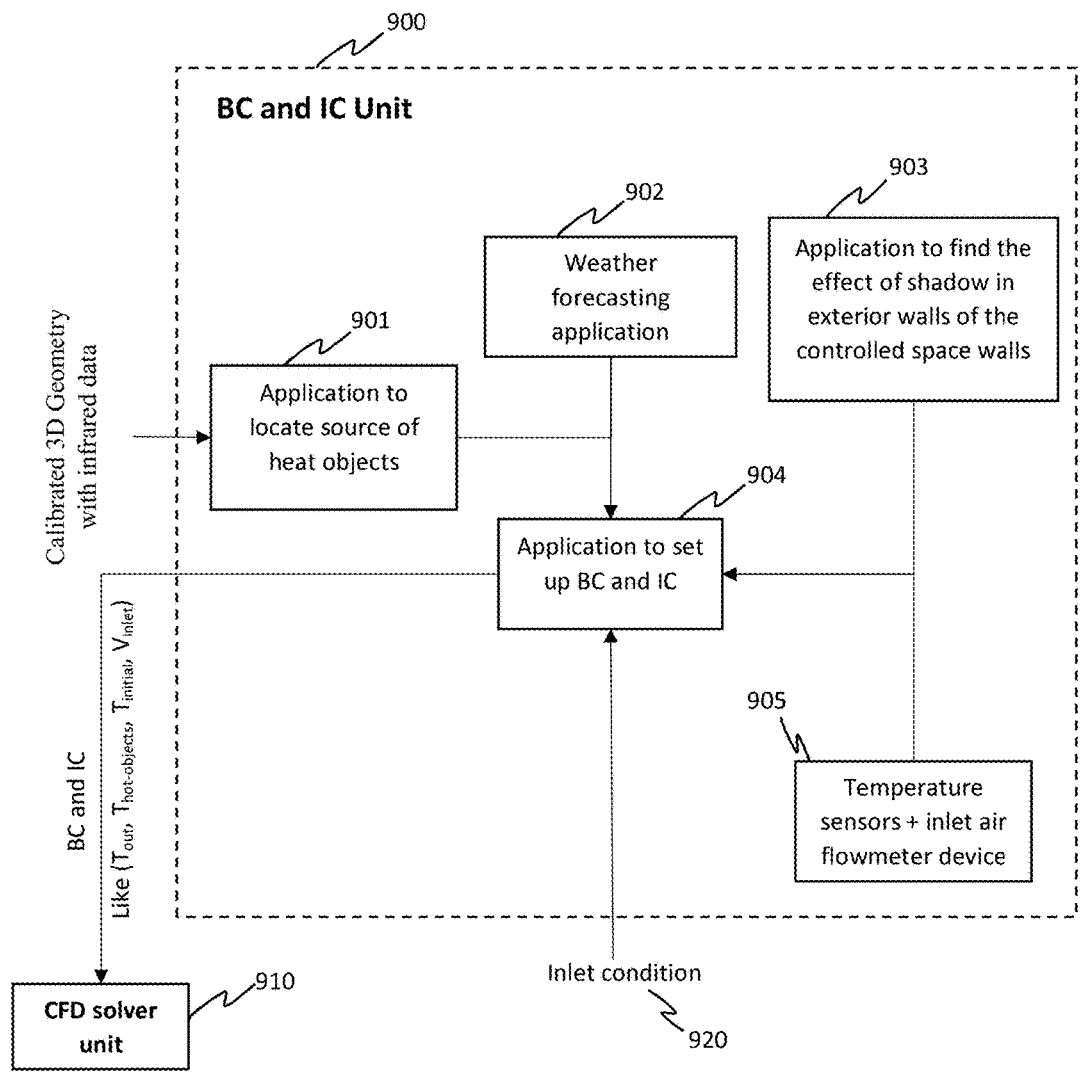
FIG. 9 shows BC and IC unit's components and data flow.

With reference to FIG. 9, the BC and IC unit 900 comprises of a heat-source-application to locate the source of the heat objects 901, a weather-application to obtain the outside temperature 902, a shadow-application to find the effect of shadow on the outside walls 903, a BC-application to set the BC and IC 904, and a number of temperature sensors and flowmeter devices 905. When the calibrated 3D model with infrared data is imported to the BC and IC unit 900, the heat-source-application 901 locates the source of heat objects based on the surface shape and temperature. It then sends those information to the BC-application 904 for the BC and IC setting. At the meantime, the weather-application 902 obtains the outside temperature based on the location of the controlled space and sends that data to the BC-application 904. The effect of outside shadow, for example from another building, is determined based on the data from internet, such as google map of the building, controlled space location, and the sun angle. All such information are then analyzed using the shadow-application 903 and are then sent to the BC-application 904. Sensors 905 are used to measure the initial temperature of the controlled space, and the inlet air flowrate and its temperature. All those data are also imported to the BC-application 904. The status of the inlet condition is imported to the BC-application 904 from the HVAC control unit. After all of those information are gathered, the BC-application 904 sets each of the BC and IC on the mesh elements in the CFD solver unit 910.

Figure 10:
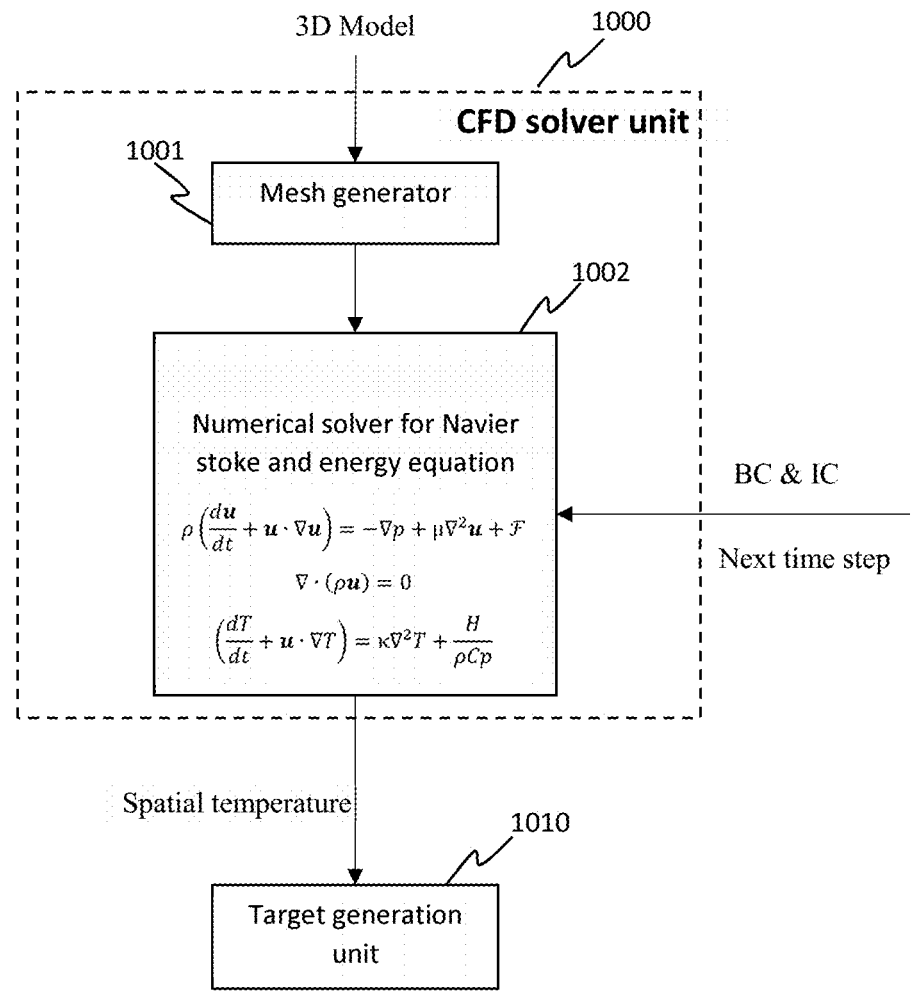
FIG. 10 shows CFD solver unit.

With reference to FIG. 10, the CFD solver unit 1000 comprises of a mesh generator 1001 and a numerical solver 1002. The mesh generator 1001 receives a simplified 3D model of the controlled space, which has to be meshed into finite volume elements through the mesh generator. The numerical solver 1002 (such as an open source software like OpenFoam) receives the meshed data file and BC and IC (which has been received from the BC and IC unit). The CFD solver first has to set BC and IC to mesh data file. The numerical solver then estimates the temperature and circulation of the air inside the controlled space based on the BC and IC. Then, the numerical solver 1002 generates the temperature distribution for the whole controlled space which will be sent to the target generation unit 1010.

Figure 11:
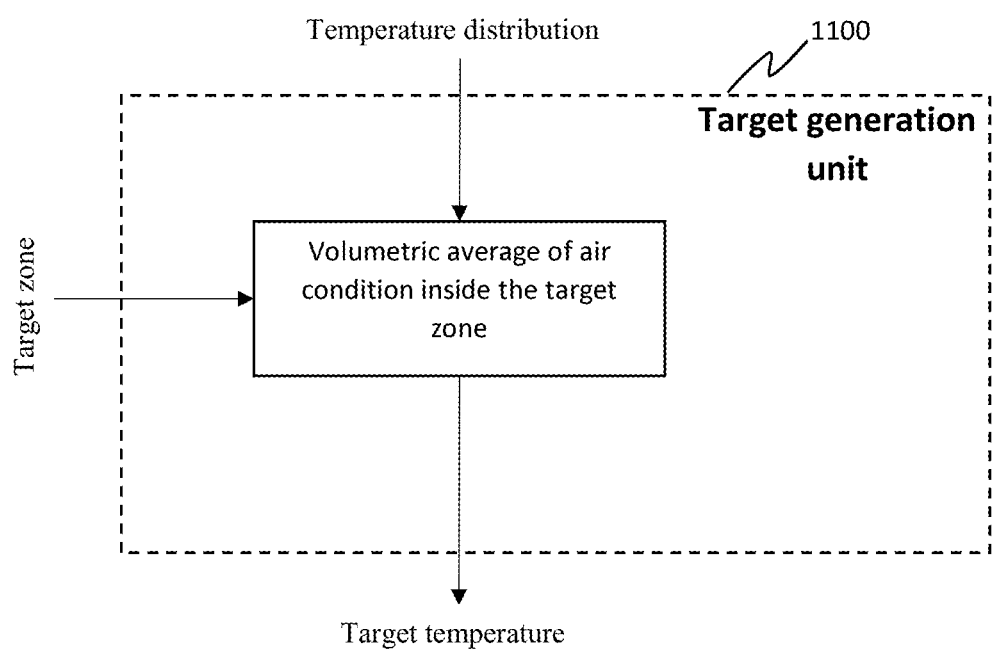
FIG. 11 shows target generation unit.

With reference to FIG. 11, the target generation unit 1100 receives the temperature distribution from the CFD solver, and the target zone from the user input and output display unit. From those information the unit extracts the volumetric average of the target zone which then send it to the HVAC control unit.

Figure 12:
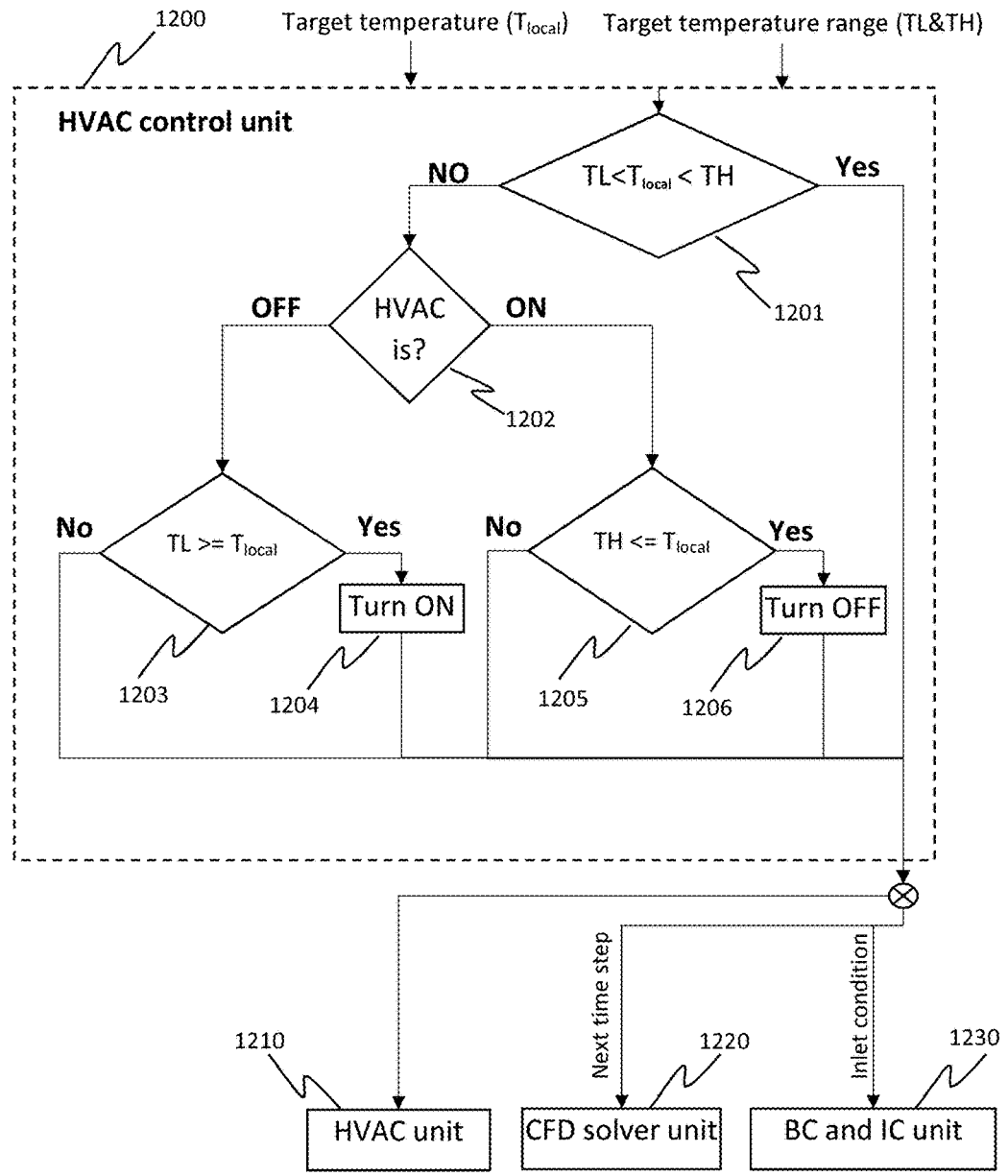
FIG. 12 shows HVAC control unit.

With reference to FIG. 12, the HVAC control unit 1200 is a logical unit that decides when to turn the HVAC unit 1210 ON and OFF, when to start the next time step for the CFD solver unit 1220, and when to change the BC and IC unit 1230 inlet condition. The unit receives two information, one of them is the target temperature range ($T_H$ and $T_L$) from the user input and output display unit, the other one is the target temperature ($T_{local}$). $T_H$ is the highest temperature which the controlled space should reach, and $T_L$ is the lowest temperature which the controlled space should reach. The unit starts by comparing $T_{local}$ with $T_H$ and $T_L$ 1201. If $T_{local}$ is in between $T_H$ and $T_L$ (yes), then the unit just keeps the system as it is and continues to the next time step by sending a signal to the CFD solver unit 1220. If $T_{local}$ is not in between (No), then the unit checks the status of the HVAC unit 1202. If the HVAC unit is ON, then $T_H$ will be compared with $T_{local}$. If $T_{local}$ is larger than or equal to $T_H$ the unit will turn the HVAC unit OFF 1206. If $T_{local}$ is less than $T_H$, the unit keeps the system as is. If the status of the HVAC unit 802 is OFF, the unit will compare $T_{local}$ with $T_L$. If $T_{local}$ is less than or equal $T_L$, the unit will turn the HVAC unit ON 1204. If $T_{local}$ is higher than $T_L$ the unit will keep the system as is.

Figure 13:
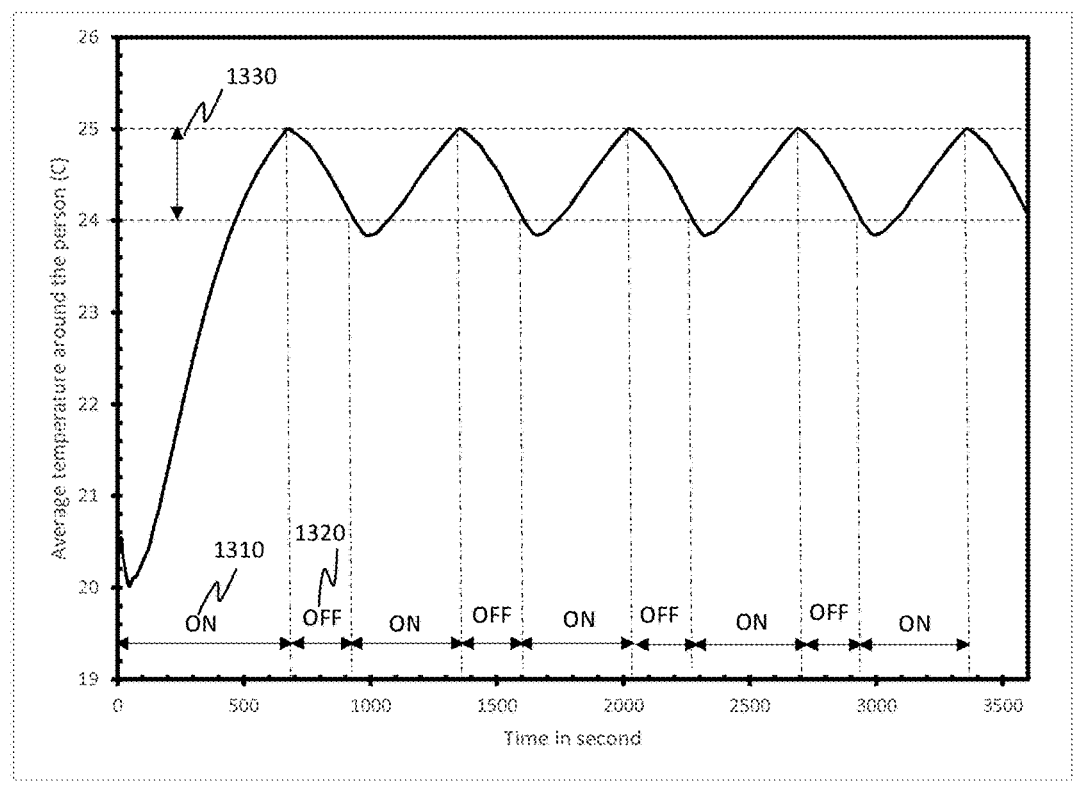
FIG. 13 shows operation chart of a HVAC system.

With reference to FIG. 12, the following gives an example to clarify the operation time of a heating HVAC system with a person standing in the middle of room by showing when the system is ON and when it is OFF. FIG. 13 shows the operation time of HVAC system. The system turned ON 1310 and OFF 1320 depending on the preferred air condition range. The acceptable temperature range 1330 for a user, in this case, is between 24° C. and 25° C. The temperature on this case increases from 20° C. at time zero to 25° C. in around 11 minutes during this time the HVAC system is ON. After this time (t=11 minutes), the HVAC system turned OFF for around 5 minutes before it turns ON again because the average temperature dropped below 24° C. and so on.

Numerical and simulation methods: There are a variety of fluid solvers, many of which can be used in the present system. A preferred solver is a computational fluid dynamic (CFD) software. CFD is used by HVAC manufactures to analyze and design HVAC system and its components, in order to improve energy performance and thermal comfort of building. Another solver that can also be used in the present system is a fast fluid dynamic (FFD) algorithm which is 10-30 time faster. By using graphic processor unit (GPU), calculation speed is boosted by 50 times than normal processor. Therefore, by using FFD and GPU, the system can be significantly reduce the computational times up to 1500 time.

Computer vision: Xbox Kinect sensor from Microsoft is used for the vision in the present system. This system has the ability to generate RGBD data by using scattered light and triangulation algorithm. Therefore, 3D reconstruction is easy and inexpensive. However, the 3D point cloud which is generated by Kinect suffers from noise, cluttering, and occlusion. Those problems create incomplete, distorted, and not accurate 3D geometry. Therefore, to overcome those problems each part in the 3D geometry is automatically replaced by a 3D CAD model similar to them. A semi-automatically high-quality CAD model generator for object detection and classification from large-scaled cluttered indoor scans is used. The main advantage of this method is that it does not require any training data for segmenting the point cloud. The algorithm is divided into three steps: (1) Preprocessing—the point cloud is converted into a collection of nearly-planar patches to reduce the size of data. (2) Patch embedding—close similar patches are embedded in a high dimensional Euclidean space. Two patches are alike when they have similar geometric properties, or they are in a consistent geometric configuration with respect to other similar patches. (3) Clustering—close patches are clustered together and consequently over the original point cloud. Then manually defining the correspondences between the detected object clusters. However, fully automatic algorithm based on learning method requires a separate acquisition of all objects of interest in each dataset. In addition, learning method requires extracting key point features and correspondents from both (3D CAD and point clouds) which used to find initial transformation matrix. The CAD registration to point cloud then can be improved by using iterative closest point algorithm (ICP). Human detection is already built on Microsoft Kinect SDK library for up to six people. This ability is used to track people motion and movement on the space which can be used to modify the location of the people inside the space. From object motion, the device can estimate the movement of any object on the space and adjust it.

Figure 14:
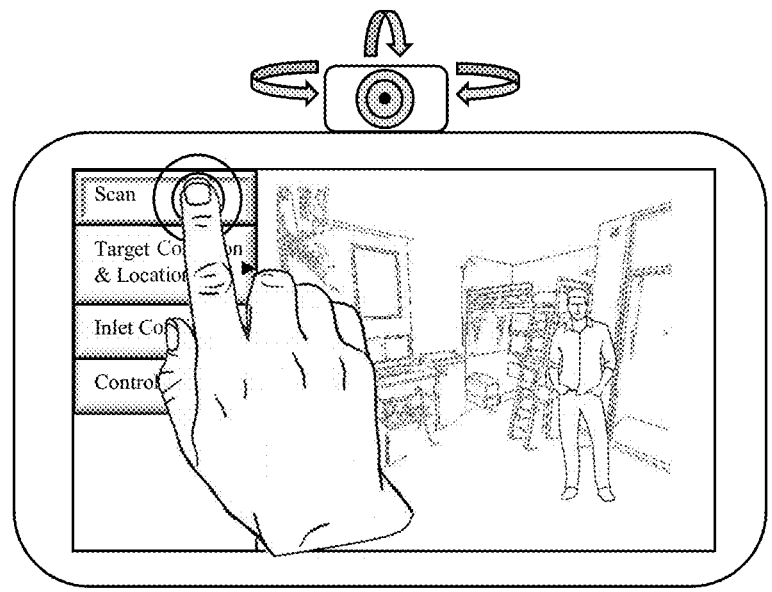
FIG. 14 illustrates the user interface to start the scan process.

One embodiment of the user interface of the device is shown in FIG. 14, when the user presses scan, the virtual thermostat starts to reconstruct a 3D model of the controlled space with furniture layout and people's positions. The virtual thermostat shows the 3D model of the controlled space on the virtual thermostat's screen.

Figure 15:
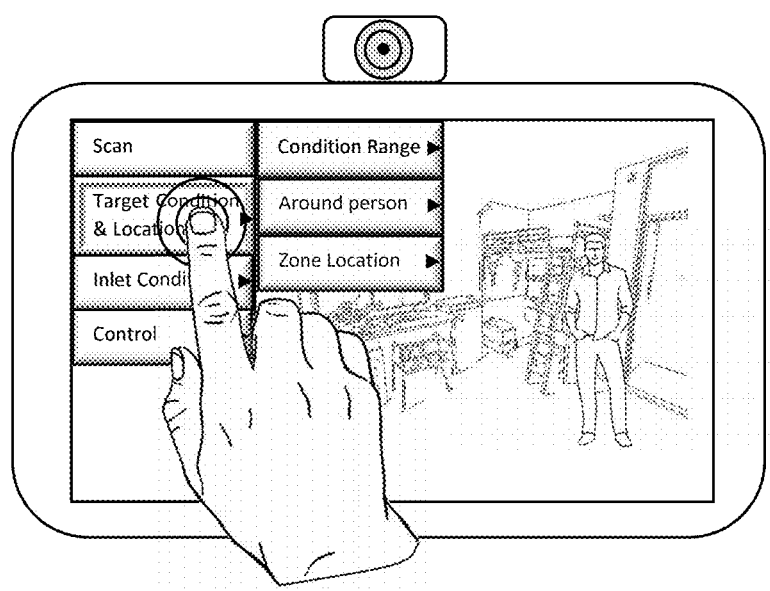
FIG. 15 shows the user identifying the preferred conditions and location.

With reference to FIG. 15, the user has to specify the preferred condition and location. When the user press target condition and location tab, three options appear. The first option is to setup the preferred condition range, the second option is to select which person should the virtual thermostat focus on, and the last option is to select the target zone location. When there are more than one person, it is better to control based on zone location instead of selecting around the person as the target location. The user either selects the second option or the third option to specify the target location. If the user sets up both options the last option will be selected automatically.

Figure 16:
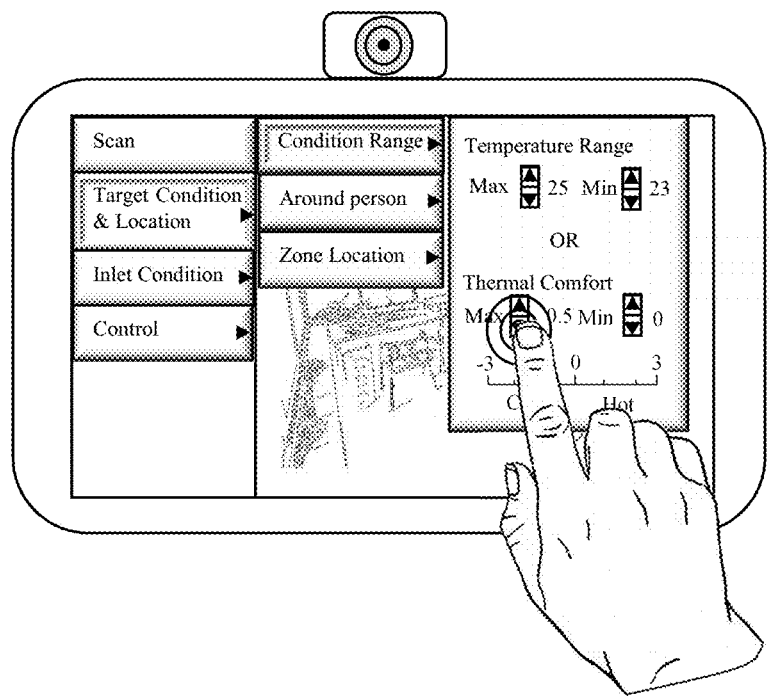
FIG. 16 shows the user setting the temperature range or the thermal comfort range.

With reference to FIG. 16, when the user presses on the condition range tab, either temperature range has to be specified or thermal comfort range has to be set. The maximum and minimum are set to specify when the HVAC system should turn ON and OFF.

Figure 17:
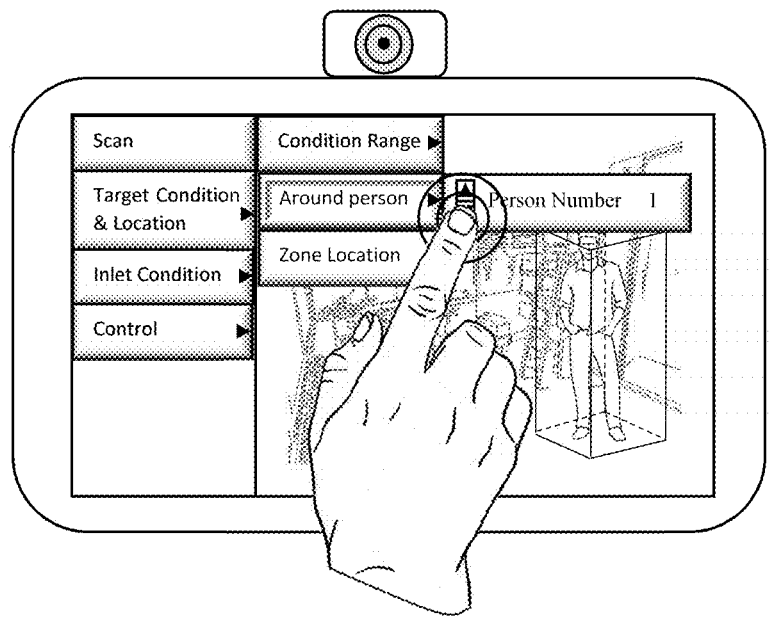
FIG. 17 shows the user choosing the person or the location that needs to be conditioned.

With reference to FIG. 17, when the user selects around the person tab option, three boxes around a first person appear. The box moves to the next person if the user changes the person number. The numbering is made automatically by the virtual thermostat to distinguish between users.

Figure 18:
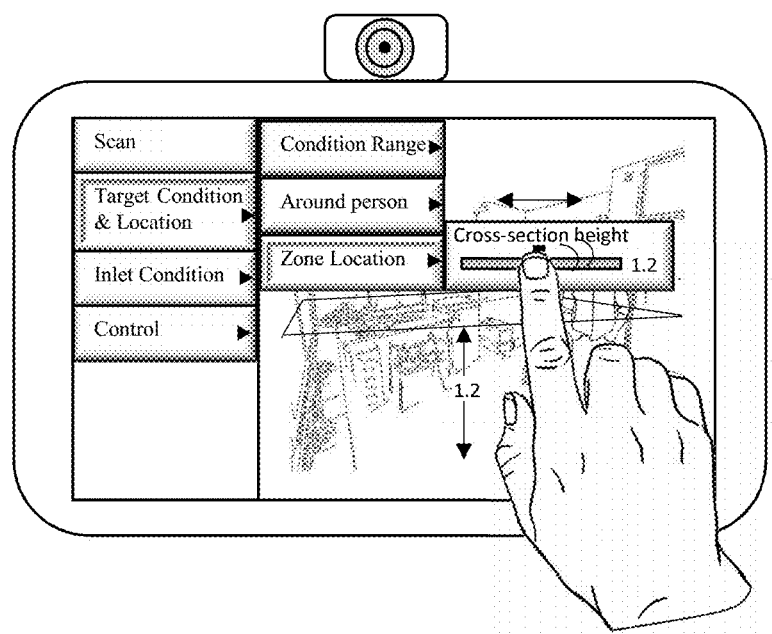
FIG. 18 shows the user controlling the height of the controlled zone.

With reference to FIG. 18, when the user selects the zone location tab, a changeable horizontal cross-section plane appears. The user can change the height of the planes to go across most of the object in the controlled space.

Figure 19:
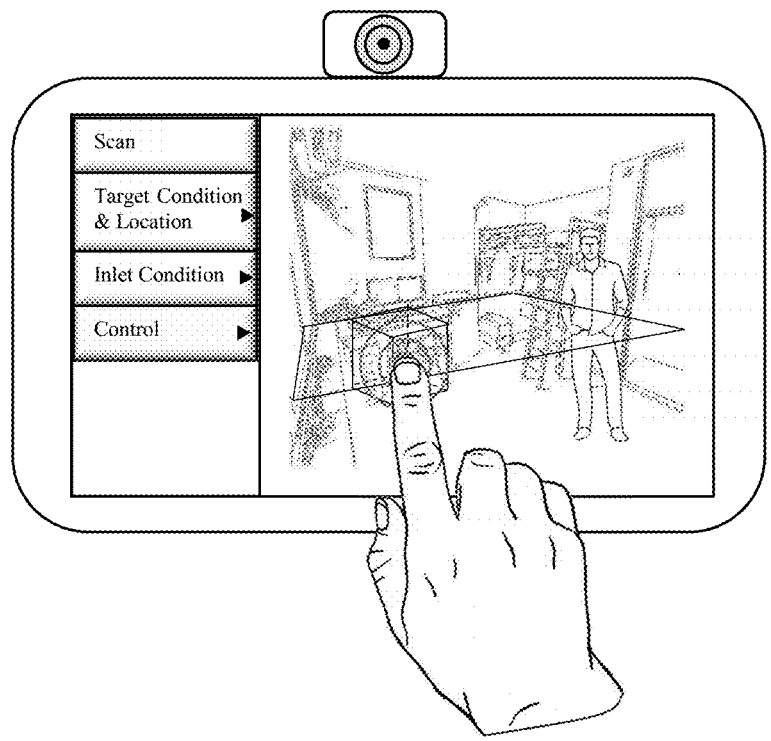
FIG. 19 shows the user identifying the center of the controlled zone.

With reference to FIG. 19, after specifying the height of the cross-section plane, the user presses on the screen to select the center of the controlled zone.

Figure 20:
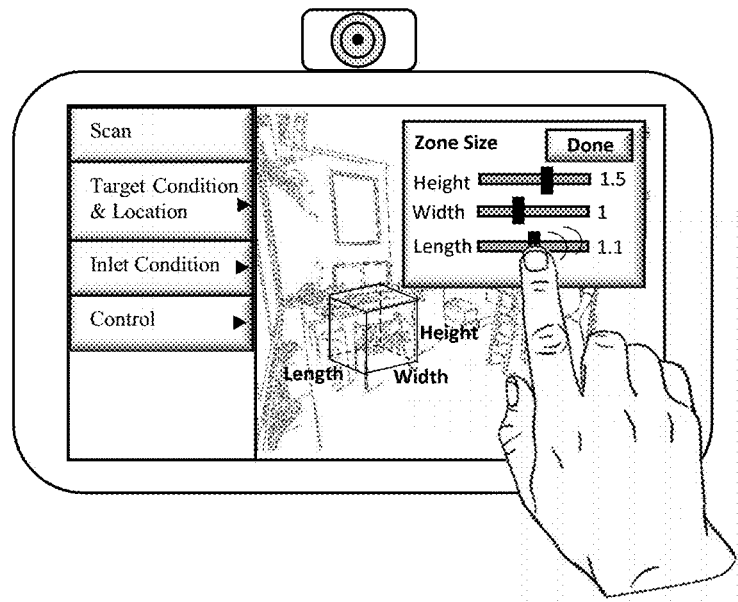
FIG. 20 shows the automatically generated control volume.

With reference to FIG. 20, when the user releases his/her finger, a default box 1×1×1 m$^3$ appears in the screen with the same selected position. In addition, a small window pops up with bars to control the size of the targeted location. The user presses done when finished setting up the zone size.

Figure 21:
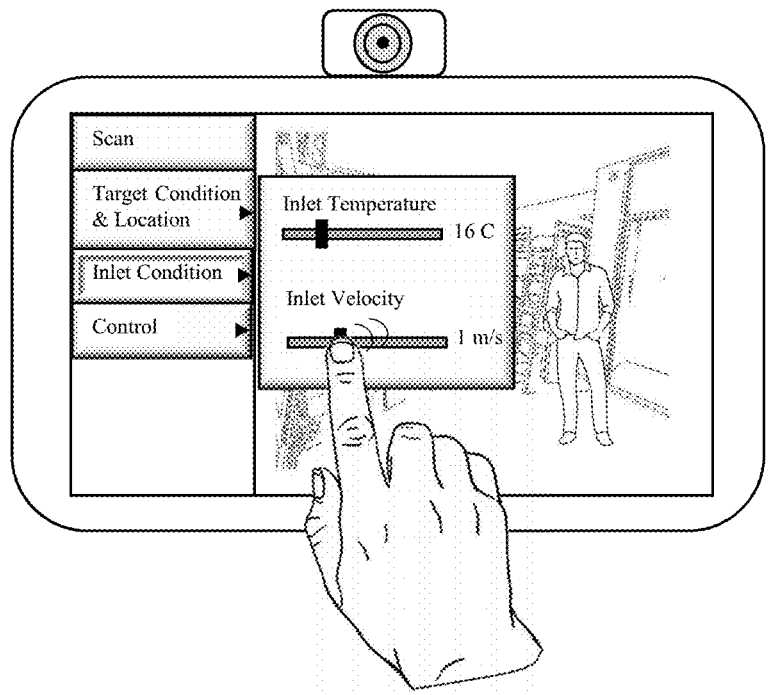
FIG. 21 shows the control tabs for the inlet conditions.

With reference to FIG. 21, when the user presses on the inlet condition tab, two bar options appear. The first bar is to set up the inlet temperature, and the second bar is for the fan speed.

Figure 22:
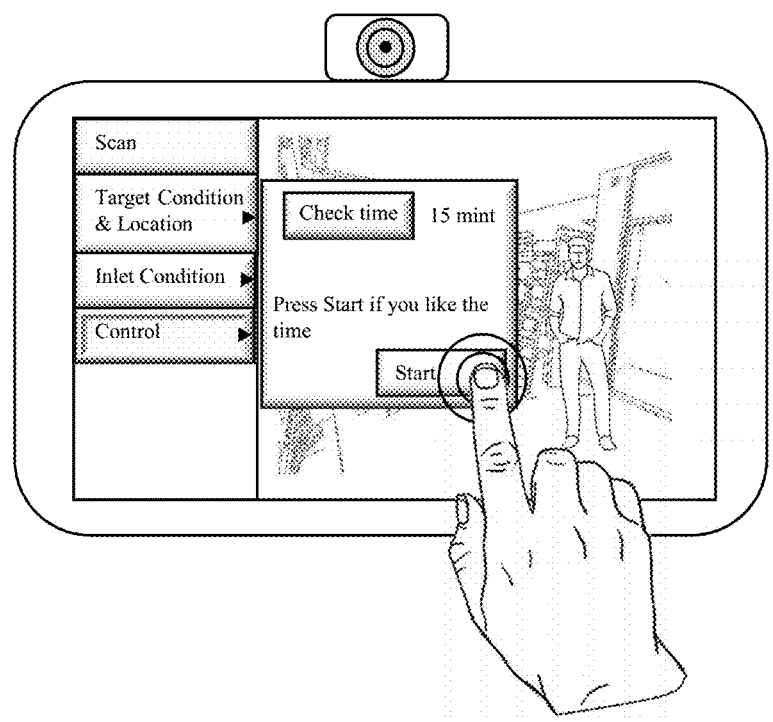
FIG. 22 shows the final step of control and starting of the system.

With reference to FIG. 22, when the user presses on the control tab, two buttons appear. The first button is to check the time button, where the user can use it to check how fast with this inlet condition setup need to reach the target condition range. If the user is not satisfied with time, he/she can change the inlet condition and check the time again until satisfaction. After setting up the inlet condition and checking the time, the user presses on the start tab to start controlling the HVAC system.

It is evident to a person skilled in the art that the above method of controlling the temperature of a target zone can be used to control other ambient parameters, such as, the humidity of the air, the velocity of the air, and the particle concentration at the target zone. Particles can include dust particles, biological particles, or pollution particles. In determining the particle distribution, the species equations together with particle dynamic equations, in addition to the energy and momentum equations are solved.

For example, in order to control the human thermal comfort, several parameters, including metabolic rate, clothing insulation, air temperature, radiant temperature, air velocity, relative humidity have to be controlled. One way to measure the human thermal comfort is through using Predicted Mean Vote (PMV). This factor is defined as:

$$PMV = [0.303e^{-0.036M} + 0.028][(M-W) -$$
$$3.96E-8 f_{cl}[(t_{cl}+273)^4 - (t_r+273)^4] - f_{cl}h_c(t_{cl}-t_a) -$$
$$3.05[5.73 - 0.007(M-W) - p_a] - 0.42[(M-W) - 58.15] -$$
$$0.0173M(5.87 - p_a) - 0.0014M(34-t_a)]$$

and $$f_{cl} = \frac{1.0 + 0.2I_{cl}}{1.05 + 0.1I_{cl}}$$

$$t_{cl} = 35.7 - 0.0275(M-W) -$$
$$R_{cl}[(M-W) - 3.05[5.73 - 0.007(M-W) - p_a] - 0.42[(M-W) -$$
$$58.15] - 0.0173M(5.87 - p_a) - 0.0014M(34-t_a)]$$

$$R_{cl} = 0.155I_{cl}$$

$$h_c = 12.1(V)^{1/2}$$

where W is the external work, M is metabolic rate W/m$^2$, $f_{cl}$ is the clothing factor, $h_c$ is the convective heat transfer coefficient, $I_{cl}$ is the clothing insulation, $p_a$ is the vapor pressure of air KPa, $R_{cl}$ is the clothing thermal insulation, $t_a$ is the air temperature in ° C., $t_{cl}$ is the surface temperature of clothing, $t_r$ is the mean radiant temperature, V is the air velocity around the person. PMV factor ranges from −3, which is cold, to +3, which is hot. The recommended PMV range for human thermal comforted based on ASHRARE 55 is between −0.5 and +0.5. People do not have the same PMV value for comfort. For example, if someone may feel comfortable at PMV of 0.5, whereas another one may feel comfortable at −0.1. Therefore, another factor is developed that considers the percentage of people who are dissatisfied with a thermal condition. This factor is referred to as Predicted Percentage of Dissatisfied (PPD), which itself is a function of PMV:

$$PPD=100-95e^{[-0.3353 PMV^4+0.2379 PMV^2)]}$$

ASHRAE 55 recommends less than 10% of PPD for an interior space. The present virtual thermostat can determine PMV and PPD of the interior space which other thermostat cannot do. PMV requires several local factors around the person as has been stated above. For example PMV requires the average temperature around the person, which can be estimated by the virtual thermostat; in addition CFD can provide other factor around the person such as air velocity, vapor pressure of air, convective heat transfer coefficient, and mean radiant temperature. For the other factors which CFD cannot provide infrared camera and RGB camera are used, for example metabolic rate is estimated from checking if the person doing any activity or not using an image recognition toolbox, clothing insulation and clothing thermal insulation are estimated. In addition, the human skin temperature and clothing surface temperature are also determined by the infrared data. Using all such data, the present thermostat can control the local PMV or PPD for people in the space.

What is claimed is:

1. A virtual thermostat to control a target-zone-temperature of a target zone in an HVAC controlled space, comprising:
   a. a real time 3D scanner to provide a 3D point cloud raw data of said HVAC controlled space;
   b. a processor to reconstruct a 3D model of said HVAC controlled space using said 3D point cloud raw data and a CAD software;
   c. a control panel for a user to input a set of boundary conditions comprising of a set of dimensions of an interior and an exterior walls of said HVAC controlled space, a set of boundary wall temperatures, an outside temperature, and a set of wall thermal resistances, and a set of initial conditions comprising of a set of initial HVAC controlled space temperatures, an initial air inlet velocity, and a desired target zone temperature at said target zone inside said HVAC controlled space;
   d. a fluid flow processor having means to read said 3D model and to determine a spatial velocity and temperature distributions throughout said HVAC controlled space, and to calculate an average target zone temperature for said target zone; and
   e. a control system to turn an air inlet flow ON and OFF to control said target zone temperature by comparing said average target zone temperature with said desired target zone temperature, whereby said virtual thermostat controls said target zone temperature inside said HVAC controlled space without an actual temperature measurement in said target zone.

2. The virtual thermostat of claim 1, further having an infrared camera sensor to measure said set of boundary wall temperatures.

3. The virtual thermostat of claim 1, further having a plurality of temperature sensors installed inside said HVAC controlled space at a plurality of sensor locations to measure a set of sensor location air temperatures, wherein said set of sensor location air temperatures define said set of initial HVAC controlled space temperatures.

4. The virtual thermostat of claim 1, further having an air velocity sensor to measure said initial air inlet velocity to be provided to the fluid flow processor.

5. The virtual thermostat of claim 1, wherein said real time 3D scanner having means to locate people and to detect motion.

6. The virtual thermostat of claim 1, further having a GPS device to utilize a local weather forecasting data provided over an internet connection to provide said outside temperature.

7. The virtual thermostat of claim 1, wherein said fluid flow processor determines said spatial velocity and temperature distributions throughout said HVAC controlled space using a set of Navier Stokes equations and a set of energy equations.

8. The virtual thermostat of claim 1, wherein said control system controls a humidity range, a velocity range, or a particle concentration range in said target zone.

9. The virtual thermostat of claim 1, further having a user-programmable interface with a display for the user to input said set of boundary conditions and said desired target zone temperature, wherein said user-programmable interface comprising a mouse, a keyboard, or a touch screen tablet, and wherein said display being a LCD or a CRT, to display an operation menu, and a set of input/output data.

10. The virtual thermostat of claim 1, wherein said real time 3D scanner has a pan tilt platform comprising of a first servo motor and a second servo motor, wherein said first servo motor rotates said real time 3D scanner by 180 degrees and said second servo motor tilts said real time 3D scanner up and down.

11. The virtual thermostat of claim 1, further having a communication system to preform data transformation with an external device.

12. The virtual thermostat of claim 1, wherein said average target zone temperature is obtained by calculating an average temperature in a 1×1×1 $m^3$ space in the target zone.

13. The virtual thermostat of claim 1, further having means to control a human thermal comfort at said target zone.

14. A method to control an air temperature of a target zone inside a controlled space having an HVAC system, said method comprising of steps of:
   a. scanning the controlled space using a 3D scanner and generating a scanner data;
   b. generating a 3D model of the controlled space with a set of boundaries using the scanner data;
   c. determining a set of temperatures on said set of boundaries;
   d. calculating a distributive air temperature for the controlled space using a fluid flow software;
   e. calculating an average temperature for the target zone using the distributive air temperature of the controlled space, and
   f. turning the HVAC system ON and OFF to control said average temperature of the target zone.

* * * * *